July 3, 1962    C. W. CRAIG    3,042,126
DRILL BITS
Filed May 3, 1961

INVENTOR
Clinton W. Craig
BY George M. Anderson

ATTORNEY

United States Patent Office 3,042,126
Patented July 3, 1962

3,042,126
DRILL BITS
Clinton W. Craig, 1004 Hull St., Clovis, N. Mex.
Filed May 3, 1961, Ser. No. 107,531
2 Claims. (Cl. 175—385)

The invention relates to drill bits.

In the construction of roads, streets, and the like, the soil thereunder must be compacted to a definite hardness and its moisture content must be known, for which there is a standard formula. It is customary in estimating these factors to dig or chisel holes in the soil to a depth of about six inches and a diameter of about three to six inches and to dip the soil out of the hole with a spoon. This procedure tends to dig the soil in lumps, to cause the soil to lose part of its moisture content, and causes loss of time.

An object of the invention is to provide a drill bit, adapted for use in a standard carpenter's brace, that will scrape and powder the soil and leave the soil in the hole, to be afterwards dipped out and into a container, thereby preserving all of its moisture content and saving time, this soil to be used in computing its compaction and moisture content.

The invention consists in the novel construction and combinations of parts hereinafter set forth in the claims.

Figures 1, 2:
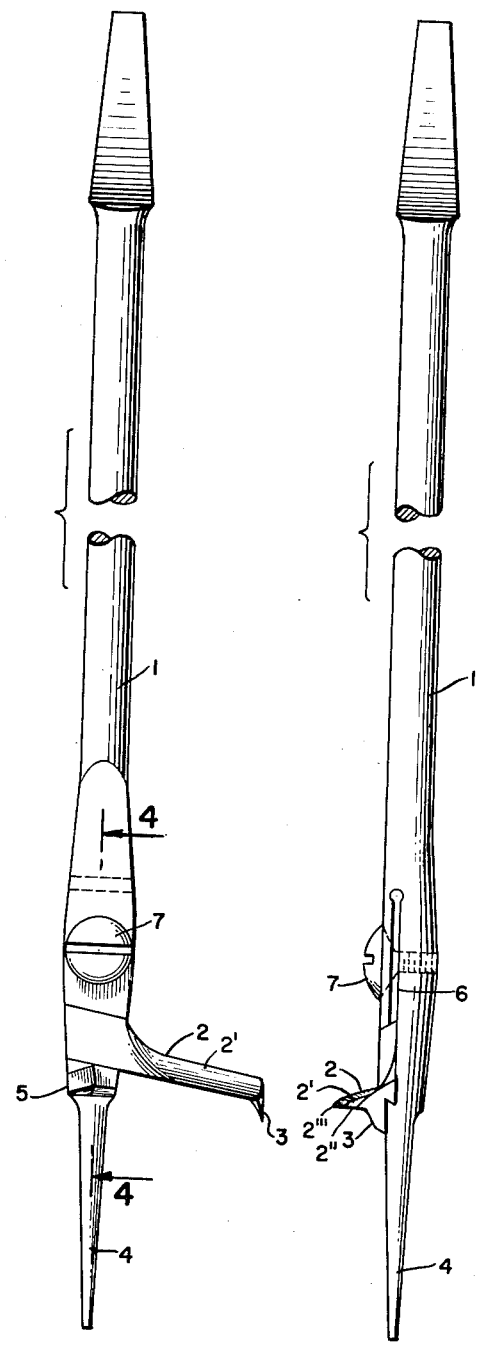
Figure 3:
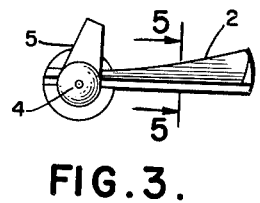
Figure 4:
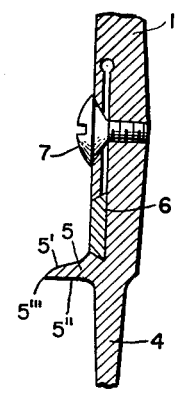
Figure 5:

In the accompanying drawings:

FIGURE 1 is a front view.
FIGURE 2 is a side view.
FIGURE 3 is a bottom plan view.
FIGURE 4 is a section on the line 4—4 of FIGURE 1.
FIGURE 5 is a section on the line 5—5 of FIGURE 3.

Referring to the drawings, 1 designates the drill bit, comprising a straight vertical shank 1, having at its lower end a generally horizontally directed straight narrow horizontally directed major scraping blade 2, extending outwardly therefrom at one side thereof, approximately radially disposed with respect thereto, said blade being slightly downwardly inclined towards and terminating at its free end in a sharp depending spur 3, said shank having below said blade a depending spike 4 for centering the bit to the hole being drilled.

Said major blade is substantially triangular in cross-section, has an inclined approximately flat upper face 2', and a horizontally directed lower face 2" intersecting said upper face at a blunt acute angle to provide a primary scraping edge 2'''.

Said shank has a horizontally directed straight minor scraping blade 5, radially disposed with respect thereto, located below and at an approximate right angle to and having a length substantially less than that of said major blade, said minor blade having an approximately flat upper face 5' and a horizontally directed lower face 5" intersecting said upper face at a blunt acute angle to provide a secondary scraping edge 5'''. Said blade 5 functions to drill a minor diameter hole in the soil simultaneously with the drilling and as part of the major diameter hole by said blade 2. The two cutting or scraping blades 2 and 5 acting together facilitate the drilling operation and enable it to be accomplished in less time.

The cutting blade 2 is removable and replaceable, being insertible within a seat 6 of the shank and secured therein by a screw 7.

Holes of varying diameters may be bored in the soil by using cutting blades of different lengths.

At the end of the drilling operation, the soil in the hole is dipped out into a container where it can be preserved for future use in computing its compaction and moisture content by a standard formula, whereas otherwise these computations could not be made to the same uniformity and accuracy.

The right is reserved to modifications coming within the scope of the claims.

I claim:

1. A drill bit for drilling holes in soil and leaving the soil in the hole being drilled, comprising a straight vertical shank having at its lower end a narrow straight horizontally directed major scraping blade radially disposed with respect to said shank, substantially triangular in cross-section and having an inclined approximately flat upper face, and a horizontally directed lower face intersecting said upper face at a blunt acute angle to provide a primary scraping edge, and a horizontally directed straight minor scraping blade radially disposed with respect to said shank, located below and at an approximate right angle to said major blade, said minor blade having a length substantially less that of said major blade, an approximately flat upper face, and a horizontally directed lower face intersecting said upper face at a blunt acute angle to provide a secondary scraping edge.

2. A drill bit as defined in claim 1, wherein said major blade has a sharp depending spur at its free end, and said shank has a vertical spike located below said minor blade for centering the bit in the hole being drilled.

References Cited in the file of this patent

UNITED STATES PATENTS

| | | |
|---|---|---|
| 509,667 | Lavigne | Nov. 28, 1893 |
| 946,060 | Looker | Jan. 11, 1910 |
| 1,379,332 | Butler | May 24, 1921 |
| 1,727,452 | Swenson | Sept. 10, 1929 |
| 2,577,986 | Wilson | Dec. 11, 1951 |